United States Patent [19]

Suzuki et al.

[11] 4,002,722
[45] Jan. 11, 1977

[54] PROCESS AND APPARATUS FOR WET TREATMENT OF VENT GAS

[75] Inventors: Hiroshi Suzuki, Kariya; Shigeru Ito, Toyokawa; Kazuyuki Nishikawa, Hoi; Tutomu Shibata, Toyokawa, all of Japan

[73] Assignee: Sintokogio, Ltd., Nagoya, Japan

[22] Filed: Mar. 12, 1975

[21] Appl. No.: 557,451

[30] Foreign Application Priority Data

Mar. 16, 1974 Japan .............................. 49-30215

[52] U.S. Cl. ............................ 423/238; 423/245; 21/55

[51] Int. Cl.² ........................................ B01D 53/34

[58] Field of Search .......... 423/210, 224, 238, 245; 21/55, 58

[56] References Cited

UNITED STATES PATENTS 3,021,189  2/1962  Mancke et al. ............... 423/238 X
3,905,774  9/1975  Kotting ........................ 423/210 X

*Primary Examiner*—Earl C. Thomas
*Attorney, Agent, or Firm*—Armstrong, Nikaido & Wegner

[57] ABSTRACT

Vent gas containing disagreeable odor components consisting mainly of phenolic substances evolving from foundries using shell molding sand containing phenol resin as a binder is efficiently wet-treated by scrubbing the vent gas with an aqueous absorbent solution, to which a ferrous salt and hydrogen peroxide are added so that a ferrous ion concentration may be at least one-seventh of a hydrogen peroxide concentration, thereby making an oxidation-reduction potential of the aqueous absorbent solution have at least a value of (540 − 60 × PH value) mV, wherein the PH value is 5 or less.

8 Claims, 1 Drawing Figure

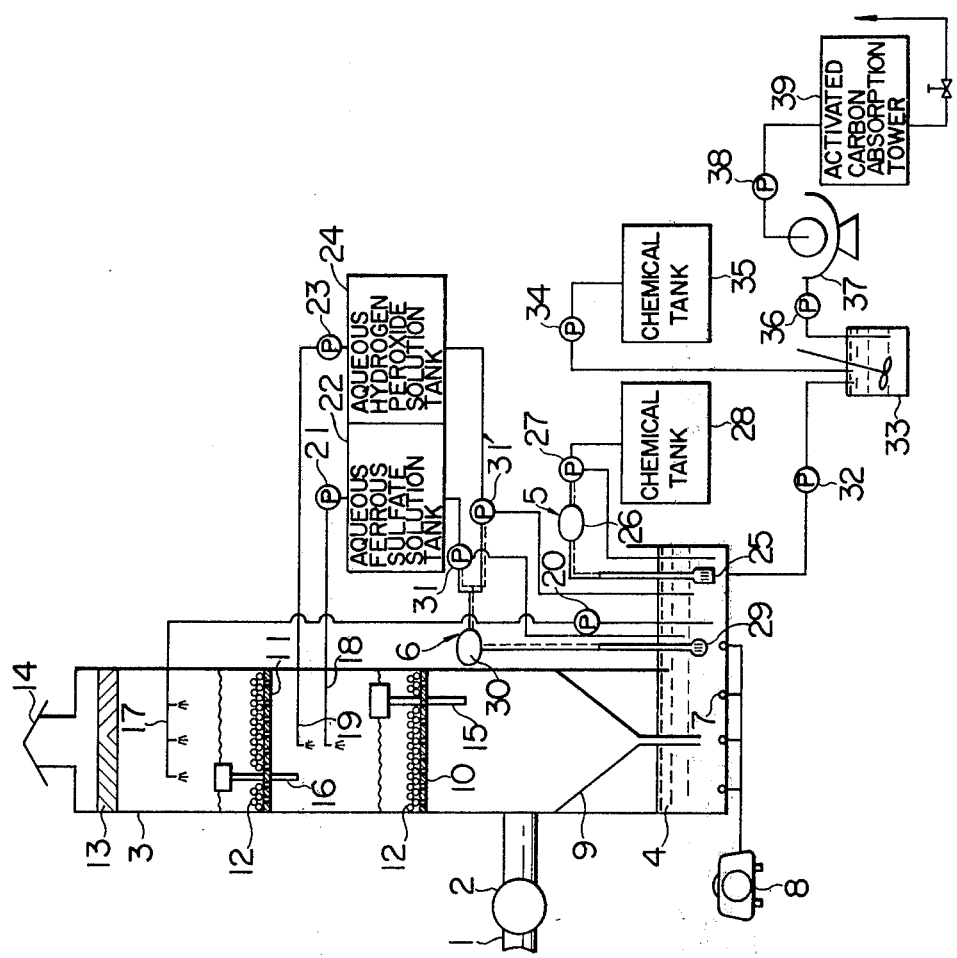

PROCESS AND APPARATUS FOR WET TREATMENT OF VENT GAS

This invention relates to a process and apparatus for wet treatment of vent gas having a disagreeable odor originating mainly from phenolic substances.

The present invention is applicable to deodorization of a foundry gas using shell molding sand containing phenol resin as a binder, or other factories generating disagreeable odor components such as phenol, formaldehyde, etc.

Usually, a process and apparatus for wet treatment of disagreeable odors based on utilization of a an absorption tower of scrubber type are widely employed, because of such advantages as their simple maintainance, low running cost, etc. It seems that a maximum absorption efficiency can be obtained in the absorption of water-soluble gas such as phenol and formaldehyde, when a large amount of fresh water is used as the aqueous absorbent solution, but there are still the following problems. That is, it is difficult to provide a large amount of fresh water; even if a concentration of disagreeable odor components in the aqueous absorbent solution is low after the absorption, the discharge of such solution as a waste effluent will cause water pollution; when such waste effluent is further subjected to water treatment, initial cost and running cost will be greatly increased thereby. Under these situations, operating conditions such as a water recycle system, fresh water feed rate, etc. are approximately set in view of a capacity of the absorption tower, gas-liquid equilibrium relations of disagreeable odor components and running cost, and the absorption tower is operated under the thus set operating conditions, where a recycle aqueous absorbent solution is subjected to water treatment at a rate equal to the feed rate of fresh water, and then is discharged as an effluent or reused. However in such a treating procedure, the concentration of disagreeable odor components in the solution is gradually increased and will reach a stationary value. When the concentration reaches the stationary value, discharge of the disagreeable odor components from the solution into the gas is initiated from the gas-liquid equilibrium relation, and ultimately a driving force for the absorption is reduced. The absorption efficiency of the aqueous absorbent solution is considerably lowered, as compared with the case of fresh water. Consequently, an apparatus of large size must be used to increase the absorption efficiency, and thus there is such a problem as poor effectiveness in treating the vent gas of higher disagreeable odor component concentration.

An object of the present invention is to provide a process for wet treatment and consequent deodorization of disagreeable odor gas evolving phenolic substances.

Another object of the present invention is to provide a process for wet treatment of vent gas, which permits deodorization of a foundry gas using shell molding sand containing phenol resin as a binder.

Another object of the present invention is to provide a process for wet treatment of vent gas, which permits reduction in the amount of aqueous absorbent solution to be used in the present process, and also permits recycle use of the aqueous absorbent solution.

A further object of the present invention is to provide a process for wet treatment of vent gas, which permits reduction in the amount of chemicals to be used in the absorption of disagreeable odor gas, and also permits improvement of deodorization effects.

A still further object of the present invention is to provide an apparatus for wet treatment of vent gas, which permits efficient deodorization of disagreeable odor gases of a high concentration.

A still further object of the present invention is to provide an apparatus for wet treatment of disagreeable odor gases, which permits using a smaller apparatus, and also permits saving of water and preventing of water pollution.

According to the present invention, there is provided a process for wet treatment of vent gas containing disagreeable odor components, which comprises adding a ferrous salt and hydrogen peroxide to an aqueous absorbent solution through an absorption tower provided with an aqueous absorbent solution tank and filter layers for absorption of disagreeable odor components thereby making the ferrous ion concentration at least one-seventh of the hydrogen peroxide concentration in the aqueous absorbent solution, and adjusting an oxidation-reduction potential of the thus added absorbent solution at least to a value of $(540 - 60 \times \text{PH value})$ mV, said PH value being 5 or less.

The aforementioned process may preferably comprise a step of supplying said ferrous salt and hydrogen peroxide at a definite rate to the absorption tower.

The latter process may preferably comprise a step of controlling the oxidation-reduction potential of said absorbent solution thereby reducing the disagreeable odor components, the concentration of which is substantially fluctuated.

The first-mentioned process may comprise a step of controlling said PH value of the absorbent solution thereby enhancing the absorption efficiency of said absorbent solution with respect to the alkaline components in the vent gas.

The first-mentioned process may preferably comprise a step of recycling and using said absorbent solution.

The recycling step may include filtering accumulated suspended solids in said absorbent solution.

The ferrous salt may be intermittently supplied at a definite rate to the absorption tower.

The hydrogen peroxide may be intermittently supplied at a definite rate to the absorption tower.

According to the present invention there is provided an apparatus for wet treatment of vent gas containing disagreeable odor components, comprising an absorption tower, an aqueous absorbent solution tank located in said absorption tower, filter layer means positioned in said absorption tower and above said solution tank for facilitating the absorption of the disagreeable odor components, means for adding a ferrous salt and hydrogen peroxide to the aqueous absorbent solution so that the ferrous ion concentration is made at least one-seventh of the hydrogen peroxide concentration in the aqueous absorbent solution, and controlling means for adjusting an oxidation-reduction potential of said absorbent solution at least to a value of $(540 - 60 \text{ PH value})$ mV, said PH value being 5 or less.

The apparatus may include means for recycling said absorbent solution to said absorption tower.

Now, the present invention will be described in detail by way of one embodiment of an apparatus for carrying out the process of the present invention, referring to the accompanying drawing.

The single FIGURE is a schematic view illustrating one embodiment of an apparatus for carrying out the process of the present invention.

As shown in the Figure, an apparatus for wet treatment of vent gas comprises an absorption tower 3, which treats a vent gas generated from steps of molding, pouring, cooling, knock-out, etc. in a foundry using shell molding sand, which the vent gas flows into the absorption tower 3 through a duct 1 by a fan 2, an aqueous absorbent solution tank 4 provided at the bottom of said absorption tower 3, a pH controlling device 5, which is provided at said aqueous absorbent tank 4 and permits control of a pH value of the aqueous absorbent solution within the aqueous absorbent solution tank 4, and an oxidation-reduction potential controlling device 6. Within said aqueous absorbent solution tank 4, there is provided a gas-dispersing pipe 7 for stirring the aqueous absorbent solution, and the gas-dispersing pipe is connected to a compressor 8. Furthermore, within the absorption tower 3, there is provided a funnel-type hopper 9 above the aqueous absorbent solution tank 4 and filter layers 10 and 11 above the hopper 9. The filter layers 10 and 11 are absorption plates of packing materials, which are comprised of a large number of small glass spheres 12 placed upon perforated plates as trays. Above the filter layers 10 and 11, there is provided an eliminator 13, and there is a vent outlet 14 above the eliminator 13. Overflow pipes 15 and 16 penetrate through the filter layers 10 and 11, and the lower end of the lower overflow pipe 15 is faced toward the hopper 9. Various procedures are available for adding ferrous salt and hydrogen peroxide at definite feed rates, but in the present case, a spray nozzle 17 for feeding the aqueous absorbent solution, and spray nozzles 18 and 19 for feeding an aqueous ferrous sulfate (heptahydrate) solution and an aqueous hydrogen peroxide solution, respectively, are provided above the filter layer 11, and the filter layer 10, respectively. The spray nozzle 17 for the aqueous absorbent solution is connected to the absorbent solution tank 4 through a piping through a pump 20. The spray nozzle 18 for feeding the aqueous ferrous sulfate (heptahydrate) solution is connected to an aqueous ferrous sulfate (heptahydrate) solution tank 22 through a piping through a pump 21, and the spray nozzle 19 for feeding the aqueous hydrogen peroxide solution is connected to an aqueous hydrogen peroxide solution tank 24 through a piping through a pipe 23. Therefore, the vent gas containing disagreeable odor components, which is led to the absorption tower 3 by the fan 2, ascends through the tower, while being brought in contact with the aqueous absorbent solution sprayed from the spray nozzle 17, passes through the filter layers 10 and 11, and the eliminater 13, and is discharged from the vent outlet 14 to the atmosphere. At the same time, the aqueous absorbent solution flowing down through the filter layers 11 and 10 is introduced into the aqueous absorbent solution tank 4 along the hopper 9, and recycled for reuse. The pH controlling device 5 provided with a pH electrode 25 inserted into the aqueous absorbent solution tank 4 and a pH control meter 26 to be actuated by said pH electrode 25 is provided in the aqueous absorbent solution tank 4. A neutralizing agent such as sulfuric acid, etc. in a chemical tank 28 is supplied to the aqueous absorbent solution tank 4 through a pump 27 by means of said pH controlling device 5, and pH adjustment of the aqueous absorbent solution is carried out thereby. Furthermore, the oxidation-reduction potential controlling device 6 provided with an oxidation-reduction electrode 29 inserted in the aqueous absorbent solution tank 4, and an oxidation-reduction potential control meter 30 to be actuated by the electrode 29 is provided in the aqueous absorbent solution tank 4. The aqueous ferrous sulfate (heptahydrate) solution and the aqueous hydrogen peroxide solution are fed to the aqueous absorbent solution tank 4 from the aqueous ferrous sulfate (heptahydrate) solution tank 22 and the aqueous hydrogen peroxide solution tank 24 through pumps 31 and 31', respectively, by said oxidation-reduction potential controlling device 6, thereby adjusting the oxidation-reduction potential of the aqueous absorbent solution. Furthermore, in order to prevent accumulation of suspended solids in the aqueous absorbent solution tank 4, the aqueous absorbent solution is always fed to a pit 33 through a pump 32, and the neutralizing agent is supplied to said pit 33 from a chemical tank 35 through a pump 34 to adjust the pH value. The reaction solution containing the suspended solids in said pit 33 is led to a filter 37 through a pump 36, and the filter cake separated by the filter 37 is discharged to the outside of the filter, while a filtrate is led to an activated carbon absorption tower 39 through a pump 38. In the activated carbon adsorption tower 39, the disagreeable odor components are treated by adsorption, and clear water resulting from the treatment is returned to the aqueous absorbent solution tank 4 to make up the aqueous absorbent solution, or reused for diluting chemicals.

The filtrate separated by the filter 37 may be directly led to the aqueous absorbent solution tank 4 through a pump 38 without passing it through the activated carbon adsorption tower 39, and reused as the aqueous absorbent solution.

50 Nm$^3$/min. of a vent gas containing disagreeable odor components generated from a molding machine of shell mold is treated through said apparatus for wet treatment of the vent gas, where main components of disagreeable odor are phenol, formaldehyde and ammonia (only this component is alkaline), and concentrations of these respective disagreeable odor components are 1.0 ppm, 0.8 ppm and 30 ppm at the inlet of the absorption tower. A solution-gas ratio, that is, a ratio of the rate of the aqueous absorbent solution fed to and sprayed from the spray nozzle 17 through the pump 20 to the feed rate of the vent gas containing the disagreeable odor components fed to the absorption tower 3 is set to 0.5 $l$/Nm$^3$ (the amount of circulating aqueous absorbent solution: 250 $l$/min). Volume of the aqueous absorbent solution within the aqueous absorbent solution tank 4 is 0.2 m$^3$. Test is conducted under said conditions. It is not always necessary to continuously feed an aqueous ferrous sulfate (heptahydrate) solution and/or an aqueous hydrogen peroxide solution to be sprayed over the filter layer 10 (that is, intermittent feeding), but in the case of the continuous feeding, an aqueous ferrous sulfate (heptahydrate) solution and/or an aqueous hydrogen peroxide solution are added to the circulating aqueous absorbent solution to take concentrations of 40 ppm, respectively, thereby controlling the pH value of the aqueous absorbent solution to 3 and the oxidation-reduction potential to at least +360 mV. The test results are shown in Table 1.

Table 1

| Item | Disagreeable odor components | Phenol | Formaldehyde | Ammonia |
|---|---|---|---|---|
| Inlet concentration (ppm) | | 1.0 | 0.8 | 30 |
| Outlet concentration (ppm) | | 0.09 | 0.05 | 1.2 |
| Absorption efficiency (%) | | 91.0 | 93.8 | 96.0 |
| Absorbent solution concentration (ppm) | | less than 10 | less than 0.6 | |
| Oxidation-reduction potential of absorbent solution | | more than + 500 mV | | |

Among said disagreeable odor components, absorption efficiency of ammonia is changed with the pH value of the aqueous absorbent solution, and therefore sulfuric acid is added to the aqueous absorbent solution tank 4 from the chemical tank 28 by adjusting the pH controlling device 5 to neutralize the ammonia so that the pH value of the pH control meter 26 may be 3. Then, the ammonia concentration at the vent outlet 14 of the absorption tower 3 becomes less than 1.2 ppm, and it is presumed that ammonia is chemically absorbed as ammonium sulfate through contact with sulfuric acid-acidified aqueous absorbent solution in the absorption tower 3. On the other hand, it is presumed that phenol and formaldehyde are also chemically absorbed in that case, because phenol and formaldehyde undergo oxidation action through contact with ferrous sulfate (heptahydrate) and hydrogen peroxide in the filter layer 10. That is to say, when the amounts of ferrous salt and hydrogen peroxide to be added are set so as to remove phenol contained in the aqueous absorbent solution at about 100 % efficiency and when the treatment of phenol is carried out, formaldehyde can be removed at an efficiency of more than about 40 %. In that case, the oxidation-reduction potential of the aqueous absorbent solution is more than about 240 mV at pH 5, and more than about 360 mV at pH 3. With further increase in their respective amounts to be added, the oxidation-reduction potential is increased, but any great increase is not observed in the removal efficiency of the disagreeable odor components in the absorption tower 3. When the oxidation-reduction potential is adjusted to less than 240 mV at pH 5 and less than 360 mV at pH 3 by decreasing their respective amounts to be added, the removal efficiency of phenol and formaldehyde is considerably lowered. Therefore, it is necessary to maintain the oxidation-reduction potential at a value of more than 240 mV at pH 5 and at a value of more than 360 mV at pH 3, and since pH is in an increase proportion to oxidation-reduction potential, a relation between pH and oxidation-reduction potential can be represented by the following equation. Thus, it is necessary to add the ferrous salt and hydrogen peroxide so that the oxidation-reduction potential may take at least a value over that calculated according to said equation. Oxidation-reduction potential (mV) = $540 - 60 \times$ pH value.

When the pH value is more than 5, or the ferrous ion concentration is less than one-seventh of the hydrogen peroxide concentration, the removal efficiency of phenol and formaldehyde in the aqueous absorbent solution is considerably lowered, even if the pH value and the value of oxidation-reduction potential are appropriate, and the effect of oxidation action by the ferrous salt and hydrogen peroxide is not observed. Therefore, when ferrous sulfate (heptahydrate) and hydrogen peroxide are added to the circulating aqueous absorbent solution so as to take 40 ppm, respectively, the oxidation-reduction potential of the absorbent solution will be more than 500 mV, and the aqueous absorbent solution freed from phenol and formaldehyde to high degrees will be circulated. Thus, it is possible to maintain the phenol concentration and formaldehyde concentration of the aqueous absorbent solution at less than definite values, for example, less than 10 ppm and less than 0.6 ppm, respectively, even after continued operation over a prolonged period of time, while maintaining a higher absorption efficiency.

For comparison with the process of the present invention, results of treatment, using fresh water as the aqueous absorbent solution, are shown in Table 2. In Table 3 are shown, for comparison, other results of treatment of such an absorbing system, where a first tank for circulating an aqueous absorbent solution is provided at the bottom of an absorption tower similar to the absorption tower 3 shown in Figure; a partition plate is provided at the side of said first tank and a second tank for circulating an aqueous absorbent solution is provided adjacent to said first tank through said partition plate; a circulating aqueous absorbent solution treated chemically and with activated carbon is led to said second tank, and at the same time the aqueous absorbent solution from said second tank is permitted to overflow to the first tank over said partition plate; the aqueous absorbent solution in the first tank is fed to the filter layer at the upper stage in the absorption tower, and the aqueous absorbent solution in the second tank is fed to the filter layer at the lower stage in the absorption tower.

Table 2

| Item | Disagreeable odor components | Phenol | Formaldehyde | Ammonia |
|---|---|---|---|---|
| Inlet concentration (ppm) | | 1.0 | 0.8 | 30 |
| Outlet concentration (ppm) | | 0.09 | 0.03 | less than 1.2 |
| Absorption efficiency (%) | | 91.0 | 96.3 | less than 96.0 |

Table 3

| Item | Disagreeable odor components | Phenol | Formaldehyde |
|---|---|---|---|
| Inlet concentration (ppm) | | 1.0 | 0.8 |
| Outlet concentration (ppm) | | 0.24 | 0.11 |
| Absorption efficiency (%) | | 76.0 | 86.3 |
| Absorbent solution concentration (ppm) | | 57.9 | 16.8 |

It is apparent from Table 2 that phenol and formaldehyde are soluble in water and absorbed into fresh water, but their absorption efficiency depends upon their gas-liquid equilibrium relations. That is, their absorption efficiency is lowered at higher concentrations of phenol and formaldehyde in the fresh water as the aqueous absorbent solution. Further, in the absorption tower system, whose results of treatment are shown in Table 3, the absorption efficiency of disagreeable odor gas in the absorption tower is very low, as compared with the absorption efficiency of the present invention shown in Table 1. Furthermore, it is seen that in said absorption tower system the concentrations of phenol and formaldehyde in the absorbent solution to be recycled for use are very high.

As is apparent from the foregoing description, the aqueous absorbent solution can be recyclically used in the present invention over a prolonged period of time by adjusting the pH value of the aqueous absorbent solution to 5 or less and adding the ferrous salt and hydrogen peroxide to the aqueous absorbent solution, so that the ferrous ion concentration may be at least one-seventh of the hydrogen peroxide concentration in the absorbent solution thereby to maintain the oxidation-reduction potential of the absorbent solution at least at a value of $(540 - 60 \times pH\ value)$ mV. In spite of the prolonged period of operation, phenol and formaldehyde can be kept at low concentrations in the aqueous absorbent solution in the present invention, and thus a very high absorption efficiency of disagreeable odor gas, which is almost equal to that attained when fresh water is used as the aqueous absorbent solution, can be obtained. That is, a great improvement in performance can be expected in the present invention, as compared with the conventional art, and the vent gas containing the disagreeable odor components at high concentrations can be treated in a more compact apparatus of the present invention. Furthermore, the aqueous absorbent solution can be completely recycled for use and thus a smaller amount of the aqueous absorbent solution than that of the prior art is sufficient for the treatment of the same volume of the vent gas as treated in the prior art. That is, the treatment can be effected in a more compact equipment, and also a large amount of chemicals is not necessary to use in the present invention. Further advantages of the present invention is a simple and economical maintenance of operation, saving of water resource and prevention of water pollution. Thus, the present invention has a great industrial significance.

What is claimed is:

1. A process for wet treatment of vent gas containing at least one disagreeable odor component selected from the group consisting of phenols, formaldehydes and ammonia, which comprises adding a ferrous salt and hydrogen peroxide to an aqueous absorbent solution in an absorption tower provided with an aqueous absorbent solution tank and filter layers for absorption of the disagreeable odor components, thereby making the ferrous ion concentration at least one-seventh of the hydrogen peroxide concentration in the aqueous absorbent solution, and adjusting an oxidation-reduction potential of the thus added absorbent solution at least to a value of $(540 - 60 \times pH\ value)$ mV, said pH value being 5 or less and contacting said vent gas with said aqueous absorbent solution.

2. A process as claimed in claim 1, comprising supplying said ferrous salt and hydrogen peroxide at a definite rate to the absorption tower.

3. A process as claimed in claim 2, comprising controlling the oxidation-reduction potential of said absorbent solution thereby reducing the amount of components, the concentration of which is substantially fluctuated.

4. A process as claimed in claim 1, comprising controlling said pH value of the absorbent solution thereby enhancing the absorption efficiency of said absorbent solution with respect to the alkaline components in the vent gas.

5. A process as claimed in claim 1, comprising recycling said absorbent solution.

6. A process as claimed in claim 5, wherein said recycling step includes filtering accumulated suspended solids in said absorbent solution.

7. A process as claimed in claim 2, wherein said ferrous salt is intermittently supplied at the definite rate to the absorption tower.

8. A process as claimed in claim 2, wherein said hydrogen peroxide is intermittently supplied at the definite rate to the absorption tower.

* * * * *